(12) United States Patent
Guilford et al.

(10) Patent No.: US 8,930,681 B2
(45) Date of Patent: Jan. 6, 2015

(54) ENHANCING PERFORMANCE BY INSTRUCTION INTERLEAVING AND/OR CONCURRENT PROCESSING OF MULTIPLE BUFFERS

(75) Inventors: James D. Guilford, Northborough, MA (US); Wajdi K. Feghali, Boston, MA (US); Vinodh Gopal, Westborough, MA (US); Gilbert M. Wolrich, Framingham, MA (US); Erdinc Ozturk, Marlborough, MA (US); Martin G. Dixon, Portland, OR (US); Deniz Karakoyunlu, Waltham, MA (US); Kahraman D. Akdemir, Franklin, MA (US)

(73) Assignee: Intel Corporation, Santa Clara, CA (US)

( * ) Notice: Subject to any disclaimer, the term of this patent is extended or adjusted under 35 U.S.C. 154(b) by 1062 days.

(21) Appl. No.: 12/963,298

(22) Filed: Dec. 8, 2010

(65) Prior Publication Data
US 2012/0151183 A1   Jun. 14, 2012

(51) Int. Cl.
*G06F 9/38* (2006.01)
*G06F 9/30* (2006.01)
*G06F 9/48* (2006.01)

(52) U.S. Cl.
CPC .......... *G06F 9/3851* (2013.01); *G06F 9/30109* (2013.01); *G06F 9/4843* (2013.01)
USPC ....................................................... 712/220

(58) Field of Classification Search
CPC .. G06F 9/3851; G06F 9/30109; G06F 9/4843
USPC ........................................................ 712/220
See application file for complete search history.

(56) References Cited

U.S. PATENT DOCUMENTS

| 6,240,487 | B1 | 5/2001 | Liu et al. |
| 7,383,420 | B2 | 6/2008 | Plondke et al. |
| 7,512,945 | B2 * | 3/2009 | Sydir et al. ............ 718/100 |

(Continued)

FOREIGN PATENT DOCUMENTS

| WO | 2012/078378 A2 | 6/2012 |
| WO | 2012078378 A3 | 8/2012 |

OTHER PUBLICATIONS

Manley et al.; "Code Generation for Hardware Accelerated AES"; 2010; IEEE.*

(Continued)

*Primary Examiner* — Andrew Caldwell
*Assistant Examiner* — Benjamin Geib
(74) *Attorney, Agent, or Firm* — Christopher K. Gagne (57) ABSTRACT

An embodiment may include circuitry to execute, at least in part, a first list of instructions and/or to concurrently process, at least in part, first and second buffers. The execution of the first list of instructions may result, at least in part, from invocation of a first function call. The first list of instructions may include at least one portion of a second list of instructions interleaved, at least in part, with at least one other portion of a third list of instructions. The portions may be concurrently carried out, at least in part, by one or more sets of execution units of the circuitry. The second and third lists of instructions may implement, at least in part, respective algorithms that are amenable to being invoked by separate respective function calls. The concurrent processing may involve, at least in part, complementary algorithms.

21 Claims, 5 Drawing Sheets

(56) References Cited

U.S. PATENT DOCUMENTS

| | | | |
|---|---|---|---|
| 2005/0123140 A1* | 6/2005 | Feghali | 380/265 |
| 2007/0192547 A1 | 8/2007 | Feghali et al. | |
| 2008/0162774 A1 | 7/2008 | Lyles et al. | |

OTHER PUBLICATIONS

International preliminary report on patentability and Written Opinion received for PCT Patent Application No. PCT/US2011/062127, mailed on Jun. 20, 2013.

"Intel® 64 and IA-32 Architectures", Software Developer's Manual, vol. 2A, Instruction Set Reference, A-M, Order No. 253666-037US, pp. i to xxiii and Section 3.2, Jan. 2011.

"Intel® 64 and IA-32 Architectures", Software Developer's Manual, vol. 2B ,Instruction Set Reference, N-Z, Order No. 253667-037US, Section 4.2, Jan. 2011.

Gopal et al., "Fast Cryptographic Computation on Intel® Architecture Processors Via Function Stitching", Apr. 2010,19 pages.

Gopal et al., "Processing Multiple Buffers in parallel to increase performance on Intel® Architecture Processors", Jul. 2010, 24 pages.

"Data Encryption Standard (DES)", Fips Pub 46-3, Category: Computer Security, Cubcategory: Cryptography, Oct. 25, 1999, 26 pages.

"Secure Hash Standard", Federal Information Processing Standards Publication 180-2, FIPS PUB 180-2, Category of Standard: Computer Security Standard, Cryptography, Aug. 1, 2002, 83 pages.

Meloni et al., "High Performance GHASH Function for Long Messages", ACNS'10 Proceedings of the 8th international conference on Applied cryptography and network security, 2010, 12 pages.

Rivest, R. "The MD5 Message-Digest Algorithm", Network Working Group, Request for Comments: 1321, MIT Laboratory for Computer Science and RSA Data Security, Inc., Apr. 1992, 22 pages.

Harris, B. "Improved Arcfour Modes for the Secure Shell (SSH) Transport Layer Protocol", Network Working Group , Request for Comments: 4345, Category: Standards Track, Jan. 2006, 5 pages.

Kaukonen et al., "A Stream Cipher Encryption Algorithm", Internet-Draft, Jul. 14, 1999, 28 pages.

International Search Report and Written Opinion mailed Jun. 26, 2012; International Application No. PCT/US2011/062127, filed Nov. 23, 2011; 8 pages.

Locktyukhin, Max, "Improving the Performance of the Secure Hash Algorithm (SHA-1)", Improving the performance of the Secure Hash Algorithm (SHA-1) with Intel® Supplemental SSE3 instructions, Submitted on Mar. 31, 2010, 28 pages.

* cited by examiner

ENHANCING PERFORMANCE BY INSTRUCTION INTERLEAVING AND/OR CONCURRENT PROCESSING OF MULTIPLE BUFFERS

FIELD

This disclosure relates to enhancing performance by instruction interleaving and/or concurrent processing of multiple buffers.

BACKGROUND

In one conventional arrangement, separate (e.g., sequential) function calls are made, at or near the same time, to carry out respective algorithms that are commonly associated with each other, commonly utilized together, and/or utilized at or near the same time. Also in this conventional arrangement, the algorithms may not process in parallel multiple data buffers, even when such processing and/or data may not be subject to significant data dependencies. For many such algorithms, this may reduce the processing and/or execution efficiency of these algorithms and/or may increase the processing and/or execution time involved in carrying out these algorithms beyond that which may be desirable and/or otherwise obtainable.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
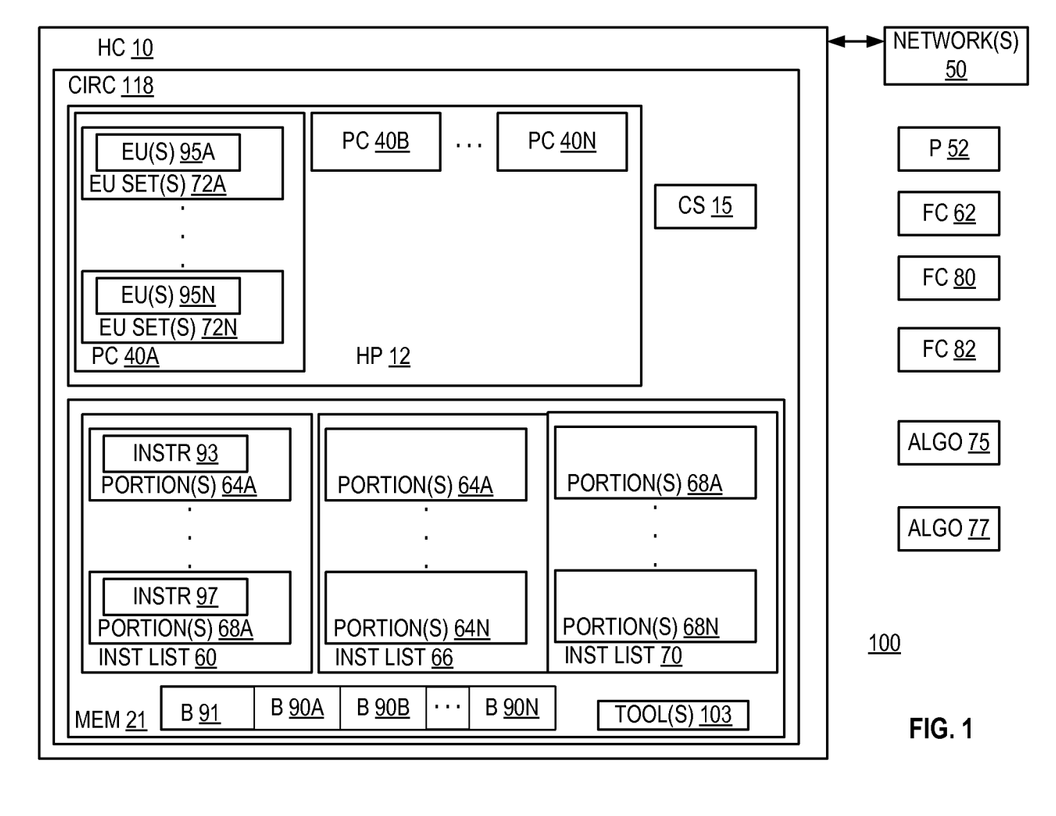
FIG. 1 illustrates a system embodiment.

FIG. 1 illustrates a system embodiment 100. System 100 may include one or more host computers (HC) 10 that may be communicatively coupled to via one or more wired and/or wireless networks 50 to one or more other host computers (not shown). In an embodiment, the terms "host computer," "host," "server," "client," "network node," "end station," "intermediate station," and "node" may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. In this embodiment, a "network" may be or comprise any mechanism, instrumentality, modality, and/or portion thereof that permits, facilitates, and/or allows, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, data and information may be used interchangeably, and may be or comprise one or more commands (for example one or more program instructions), and/or one or more such commands may be or comprise data and/or information. Also in this embodiment, an "instruction" may include data and/or one or more commands.

One or more HC 10 may comprise operative circuitry 118. Circuitry 118 may comprise one or more multi-core host processors (HP) 12, one or more chipsets (CS) 15, and computer-readable/writable memory 21. One or more chipsets 15 may comprise, e.g., memory, input/output controller circuitry, and/or network interface controller circuitry. One or more host processors 12 may be communicatively coupled via the one or more chipsets 15 to memory 21. Alternatively or additionally, although not shown in the Figures, some or all of one or more chipsets 15 and/or the functionality and components thereof may be comprised in, for example, in one or more host processors 12, or vice versa.

One or more host processors 12 may comprise a plurality of processor cores (PC) 40A . . . 40N. Each of the processor cores 40A . . . 40N may comprise a respective plurality of sets of execution units (EU) that may be capable, at least in part, of executing, in parallel or substantially in parallel with respect to each other, respective program threads. Each of these sets of execution units may comprise one or more respective execution units. For example, processor core 40A may comprise execution unit sets 72A . . . 72N. Sets 72A . . . 72N may comprise one or more respective execution units 95A . . . 95N. In this embodiment, a thread may comprise one or more sequences of operations and/or instructions that may embody, implement and/or carry out, at least in part, one or more algorithms.

In this embodiment, "circuitry" may comprise, for example, singly or in any combination, analog circuitry, digital circuitry, hardwired circuitry, programmable circuitry, co-processor circuitry, processor circuitry, controller circuitry, state machine circuitry, and/or memory that may comprise program instructions that may be executed by programmable circuitry. Also in this embodiment, a processor, processor core, core, execution unit, and controller each may comprise respective circuitry capable of performing, at least in part, one or more arithmetic and/or logical operations. Also in this embodiment, a chipset may comprise circuitry capable of communicatively coupling, at least in part, one or more host processors and memory. Although not shown in the Figures, one or more hosts 10 may comprise a graphical user interface system. The not shown graphical user interface system may comprise, e.g., a respective keyboard, pointing device, and display system that may permit a human user to input commands to, and monitor the operation of, one or more hosts 10 and/or system 100.

Memory 21 may comprise one or more of the following types of memories: semiconductor firmware memory, programmable memory, non-volatile memory, read only memory, electrically programmable memory, random access memory, flash memory, magnetic disk memory, optical disk memory, one or more random access memory cells (e.g., embedded in one or more integrated circuit chips that may implement at least in part controller and/or switch functionality), and/or other computer-readable and/or writable memory. One or more machine-readable program instructions may be stored in memory 21, circuitry 118, one or more host processors 12, and/or one or more of the PC 40A . . . 40N. In operation, these instructions may be accessed and executed by the one or more host processors 12 and/or PC 40A . . . 40N. When executed by the one or more host processors 12 and/or one or more PC 40A . . . 40N, these one or more instructions may result in the one or more host processors 12, one or more PC 40A . . . 40N, and/or one or more components thereof, performing operations described herein as being performed by these components of system 100.

In this embodiment, memory 21 may store, at least in part, respective ordered lists of instructions (e.g., lists 60, 66, and/or 70). Lists 60, 66, and/or 70 may (or may not be) contemporaneously stored, at least in part, in memory 21. List 66 may comprise one or more (and in this embodiment, a plurality of) portions 64A . . . 64N. List 70 may comprise one or more (and in this embodiment, a plurality of) portions 68A . . . 68N.

Also, in this embodiment, memory 21 may store, at least in part, data buffers 91. Buffers 91 may comprise, at least in part, a plurality of data buffers 90A, 90B, . . . 90N that contain respective data. In this embodiment, at least a subset of the respective data contained in buffers 90A, 90B, . . . 90N may be based upon, derived, and/or obtained, at least in part, from one or more packets 52 received, at least in part, via one or more networks 50 from the one or more other (not shown) host computers in system 100. Alternatively or additionally, at least a subset of one or more packets 52 may be transmitted, at least in part, from one or more host computers 10 to the one or more other host computers via one or more networks 50.

In an embodiment, a portion, subset, or fragment of an entity may comprise all of, more than, or less than the entity. Also in an embodiment, a set or list may comprise one or more group of one or more associated elements. Additionally, in this embodiment, a packet or frame may comprise one or more symbols and/or values. Furthermore, in an embodiment, a value and/or algorithm may be "predetermined" if the value and/or algorithm, at least in part, and/or one or more values, algorithms, operations, and/or processes comprised and/or involved, at least in part, in generating and/or producing the value, and/or in implementation and/or execution of the algorithm, is or are predetermined, at least in part. In this embodiment, an algorithm may comprise one or more processes, operations, techniques, computations, and/or calculations involved in, facilitating, comprised in, and/or for the purpose of producing and/or generating, at least in part, a useful result. Also in this embodiment, a cryptographic operation or algorithm contemplates one or more operations and/or algorithms that are comprised in, facilitating, and/or resulting in, at least in part, generation of cipher text from plaintext and/or generation, at least in part, of plaintext from cipher text. Additionally, in this embodiment, "plaintext" may include data that is at least in part encrypted, and/or has already undergone and/or is presently undergoing one or more cryptographic-related operations.

In this embodiment, circuitry 118 (e.g., PC 40A) may be capable of executing, at least in part, instruction list 60. Alternatively or additionally, circuitry 118 (e.g., PC 40A) may be capable of concurrently processing, at least in part, a plurality of buffers (e.g., buffers 90A and 90B). For example, the execution, at least in part, of instruction list 60 may result, at least in part, from invocation of a function call (symbolically shown by element 62). Also, for example, the concurrent processing, at least in part, of the buffers 90A, 90B may be carried out (e.g., in parallel), at least in part, by mutually different sets of execution units (e.g., respective execution unit sets 72A, 72N) of PC 40A of circuitry 118.

List 60 may comprise one or more portions 64A of instruction list 66 interleaved, at least in part, with one or more portions 68A of instruction list 70. One or more portions 64A and one or more portions 68A may be concurrently carried out (e.g., in parallel), at least in part, by different respective execution unit sets (e.g., respective execution unit sets 72A, 72N) of PC 40A of circuitry 118. List 66 and list 70 may implement, at least in part, respective algorithms (symbolically shown by elements 75 and 77, respectively). Respective algorithms 75 and 77 may be amenable to being invoked by separate respective function calls (symbolically shown by elements 80 and 82, respectively).

In this embodiment, a first entity may be considered to be interleaved with a second entity if the first entity is directly or indirectly adjacent to the second entity. Also in this embodiment, a function may comprise one or more threads. A function call may reference, refer to, and/or be associated with, at least in part, one or more functions. Invocation of a function call may involve, comprise, request, facilitate, and/or result in, at least in part, execution of one or more functions referenced, referred to, and/or associated with, at least in part, the function call.

Figure 2:
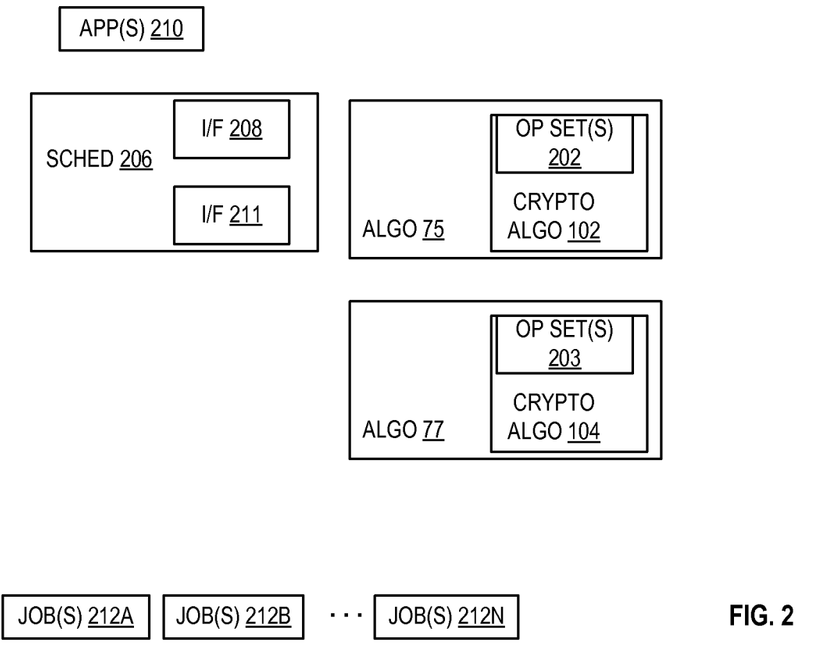
FIG. 2 illustrates features in an embodiment.

As shown in FIG. 2, algorithms 75 and 77 may comprise, at least in part, one or more respective cryptographic algorithms 102 and 104. Cryptographic algorithms 102 and 104 may comprise, at least in part, respective sets 202 and 203 of cryptographic algorithms and/or algorithmic operations.

In this embodiment, one or more program process tools 103 may generate, at least in part, list 60 based upon and/or as a result of, at least in part, lists 66 and 70. For example, one or more tools 103 may permit a human user (not shown) to generate and/or interleave, at least in part, one or more respective portions 64A, 68A from lists 66 and 70 so as to produce, at least in part, list 60. Alternatively or additionally, one or more tools 103 may generate and/or interleave, at least in part, one or more portions 64A, 68A so as to produce, at least in part, list 60, without substantial user involvement.

In this embodiment, algorithms 75 and 77 and/or portions 64A and 68A may be selected (e.g., by the user and/or one or more tools 103), and/or portions 64A and 68A may be interleaved in list 60, so as to permit the execution (e.g., by core 40A) of portions 64A and 68A in list 60 to exhibit a higher degree of parallel execution in core 40A than would otherwise occur if portions 64A and 68A were executed separately (e.g., as a result of invoking separate, sequential function calls 80 and 82). For example, in this embodiment, instead of sequentially invoking separate functions 80, 82 to implement algorithms 75 and 77, a single function call 62 to a single, composite function, embodied by list 60, that implements both algorithms 75 and 77, may be invoked. Portions 64A and 68A and/or algorithms 75 and 77 may be chosen so that they can be executed, at least in part, by different sets of execution units (e.g., sets 72A and 72N, respectively) in a single core 40A. Additionally, portions 64A and 68A may be interleaved, at least in part, with at a very fine level of granularity (e.g., instruction-level granularity). As a result, at least in part, of this, when executed as part of list 60 by core 40A, portions 64A and 68A may be executed, at least in part, by different respective sets 72A and 72N of execution units in core 40A. This may avoid execution unit contention and/or multithread execution issues that may result if separate functions 80, 82 had been separately (e.g., sequentially) invoked to implement algorithms 75 and 77. This may permit the sets 72A and 72N of execution units to execute, at least in part, these portions 64A and 68A in parallel, at least in part, from a single thread (e.g., as embodied in list 60). This may improve, in this embodiment, the processing and/or execution efficiency of these algorithms 75, 77. Additionally, this may decrease, in this embodiment, the processing and/or execution time involved in carrying out these algorithms 75, 77. This also may improve memory access efficiency and/or latency in this embodiment, since data used by the portions 64A and 68A and/or algorithms 75 and 77 may be fetched a reduced number of times (e.g., once instead of twice). Additionally, this may also increase the utilization and/or utilization ratio of the execution units and/or the sets of execution units in PC 40A. Of course, without departing from this embodiment, the respective numbers, types, and sizes of instruction lists, algorithms, and/or portions thereof that may be used together, combined, and/or interleaved, at least in part, may vary.

In this embodiment, algorithms 75 and 77 may be or comprise respective complementary cryptographic algorithms 102 and 104. For example, algorithm 102 may be or comprise an encryption algorithm, and algorithm 104 may be or comprise a complementary authentication algorithm. Examples of complementary algorithms may include algorithms that (1) do not independently fully use a processor core's execution resources (e.g., as a result at least in part of instruction/data dependency and/or latency issues related to algorithm implementation and/or the predominate respective types of instructions used in such implementation) and/or (2) are predominately implemented by different respective types of instructions and/or input data sets that may permit execution efficiency and/or parallelism to be improved when they are interleaved with each other. For example, in this embodiment, the concurrent and/or parallel execution of complementary algorithms 102 and 104 may involve different respective sets of execution units executing algorithms 102 and 104. However, without departing from this embodiment, such concurrent and/or parallel execution may involve, in a first cycle, the execution of a portion of algorithm 102 by a first set of execution units, and concurrently, the execution of a portion of algorithm 104 by a second set of execution units. Thereafter, in this embodiment, in a subsequent cycle, the second set of execution units may execute a portion of algorithm 104, while concurrently, the first set of execution units may execute a portion of algorithm 102. Alternatively or additionally, without departing from this embodiment, such concurrent and/or parallel execution may involve a single respective set of execution units executing, in succeeding respective cycles, portions of complementary algorithms (e.g., either the same algorithm or different algorithms). Accordingly, in this embodiment, such concurrent and/or parallel execution should be viewed broadly as embracing these and/or other possibilities.

Figure 4:
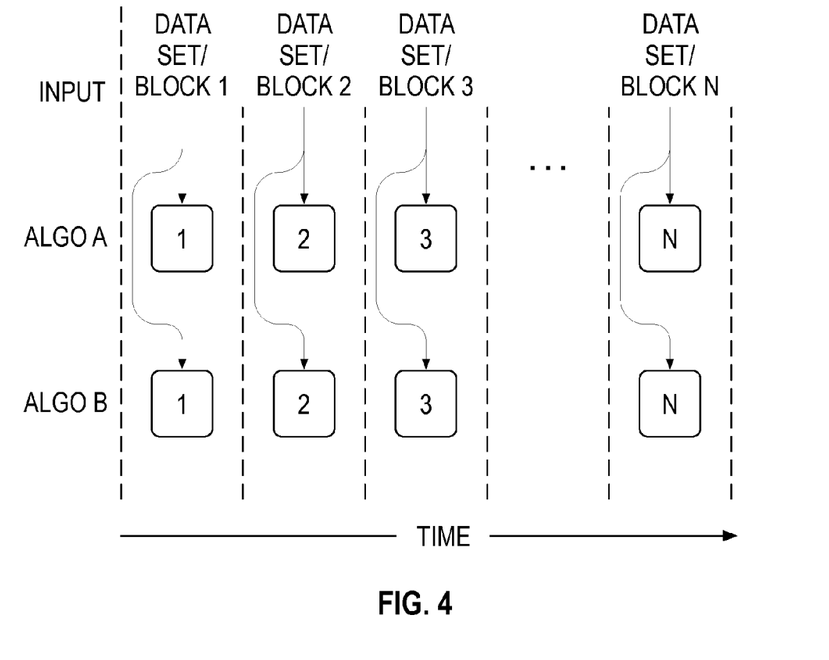
FIG. 4 illustrates features in an embodiment.

For example, as shown in FIG. 4, algorithms 102 (indicated by "Algo A") and 104 (indicated by "Algo B") may operate upon respective input data sets Block 1 . . . Block N (e.g., from one or more of the buffers 90A . . . 90N). In this example, respective input data sets Block 1 . . . Block N that may be supplied (i.e., as respective inputs) to respective algorithms 102, 104 may be identical, at least in part, to each other. Accordingly, the algorithms 102, 104 may operate in parallel, at least in part, upon respective copies, at least in part, of, and/or different respective memory pointers to, the respective input data sets Block 1 . . . Block N, and portions 64A and 68A may be executed, at least in part, in parallel by execution unit sets 72A and 72N, respectively. This may also be the case, at least in part, if the respective input data sets that are respectively supplied to the algorithms 102, 104 are independent of each other. Such independence may be exist and/or result, for example, at least in part, if the respective input data sets are not based upon, and/or do not result in or from each other, at least in part.

Figure 5:
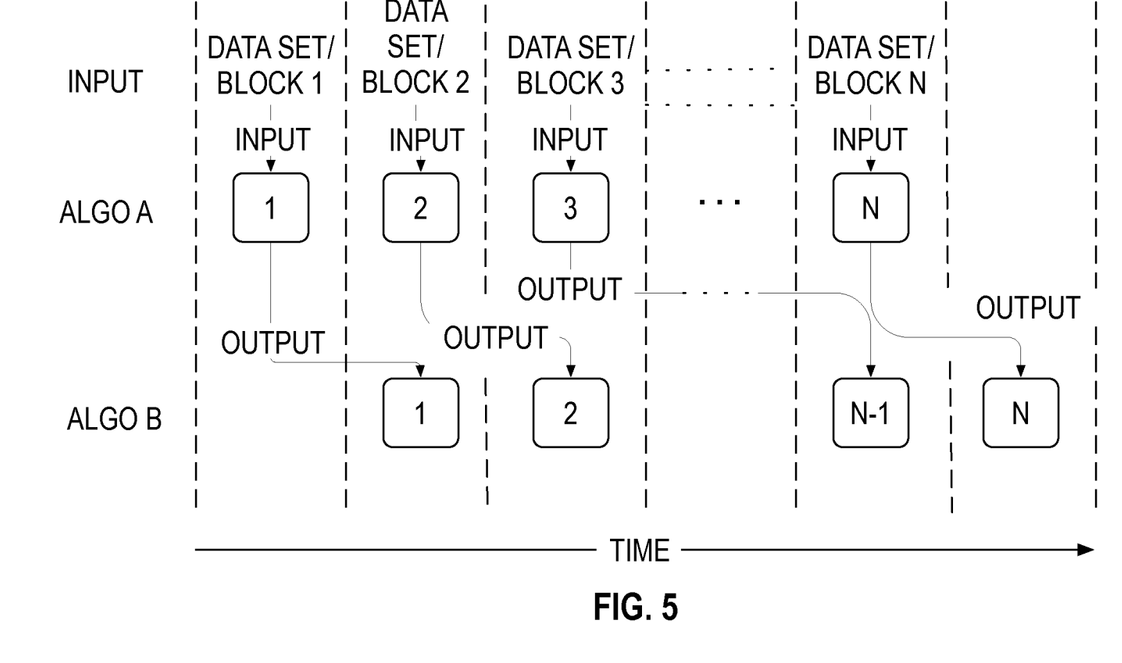
FIG. 5 illustrates features in an embodiment.

Another example is illustrated in FIG. 5. In the example of FIG. 5, the respective outputs of algorithm 102 may be utilized, at least in part, as respective inputs, to the algorithm 104. For example, if algorithm 102 comprises an Advanced Encryption Standard (AES) encryption algorithm and algorithm 104 comprises a universal hashing (GHASH) authentication algorithm, then algorithm 104 may operate, at least in part, upon the encrypted outputs produced by algorithm 102. This AES encryption algorithm may be compatible with, e.g., Federal Information Processing Standards Publication 197, National Institute of Standards and Technology (NIST), Nov. 26, 2001. In this case, respective input data sets Block 1 . . . Block N may be supplied to algorithm 102, and respective outputs generated, at least in part, by algorithm 102 may be supplied, as respective input data sets, to algorithm 104. It will be appreciated that the above, similar, and/or analogous techniques may be employed to address situations in which the respective input data sets supplied to the algorithms 102 and 104 are of the same or different respective sizes. Additionally, since the execution of algorithms 102, 104 and/or portions 64A, 68A by PC 40A may be essentially independent of each other, the manner in which portions 64A, 68 may be interleaved, at least in part, with respect to each other may be arbitrary, at least in part. Accordingly, depending upon the type of HP 12 employed, this may make it easier to schedule instruction list 60 so as to improve processor decoder performance and execution efficiency.

Returning to FIG. 1, depending upon the particular types of instructions and/or instruction architectures implemented by HP 12 and/or PC 40A, cryptographic algorithms 102, 104 may be implemented, at least in part, based upon and/or utilizing, at least in part, different respective instruction types and/or subsets. For example, Intel® 64 and IA-32 instruction set architectures have two respective instruction subsets and/or types of instructions that may be used to implement algorithms 102 and 104, at least in part: general purpose integer type instructions and Single Instruction Multiple Data (SIMD) type instructions. For purposes of this example, a SIMD type of instruction may comprise one or more Intel® streaming SIMD extensions (SSE), SSE2, and/or other (AES and/or PCLMULQDQ) instructions that, for example, may use one or more 128-bit XMM registers. Conversely, general purpose integer registers may utilize one or more 64 or 32-bit general purpose registers.

In this embodiment, advantageously, the selection of portions 64A and 68A for interleaving, at least in part, in list 60 may be made so as to permit the respective types of instructions that may be predominate (e.g., consume the greatest number of processing cycles, be computationally predominate, and/or comprise the largest number of instructions) in portions 64A and 68A to be in accordance with one of three possibilities (described below). In this embodiment, although respective instruction types may predominate in portions 64A, 68A, this does not preclude other types of instructions from being used in these portions 64A, 68A. For example, in one or more portions 64A, a respective instruction type (shown symbolically by item 93 in FIG. 1) may predominate. Also for example, in one or more portions 68A, a respective instruction type (shown symbolically by item 97 in FIG. 1) may predominate. In a first of these three possibilities, both of the respective instruction types 93, 97 that may predominate in portions 64A and 68A may be the general purpose integer type of instruction. In the second of these three possibilities, the respective instruction type 93 that may predominate in one or more portions 64A may be the SIMD type of instruction, but the respective instruction type 97 that may predominate in one or more portions 68A may be the general purpose integer of instruction. In the third of these three possibilities, the respective instruction types 93, 97 that may predominate in portions 64A and 68A may be the SIMD type of instruction.

In each of the above three possibilities, in this embodiment, the coding and/or interleaving of the portions 64A and 68A in list 60 may be such that the instructions in the one of the respective portions 64A or 68A do not cause and/or result in change in the behavior of instructions in the other of the respective portions 64A (e.g., relative to what that behavior would be if executed separately from list 60). For example, register conflicts may be avoided by having the respective portions 64A and 68A employ different respective subsets of registers (e.g., as their respective working sets). In the case where one of the respective portions 64A and 68A has a pair of instructions, and the first instruction in the pair sets a flag and the second instruction uses that flag, then interleaving may be carried out in such a way that no instruction from other respective portion that may modify that flag is inserted between the first and second instructions in the pair. By utilizing these and/or other techniques, the portions 64A and 68A may produce the same respective results, when interleaved, at least in part, in and executed as part of list 60, as they may produce if executed separately (e.g., if not interleaved).

In this first possibility, algorithm 75 may implement, at least in part, an RC4 algorithm (e.g., compatible with that described in "Improved Arcfour Modes for the Secure Shell (SSH) Transport Layer Protocol," Internet Engineering Task Force (IETF) Request for Comments (RFC) 4345, published 2006), and algorithm 77 may implement, at least in part, a Message-Digest algorithm 5 (MD-5) algorithm (e.g., compatible with that described in "The MD5 Message-Digest Algorithm," IETF RFC 1321, published 1992). Given the natures of the RC4 and MD-5 algorithms, this may result in respective data-dependency chains to exist in the portions 64A and 68A that may limit instruction level parallelism in these portions 64A and 68A. Advantageously, by interleaving, at least in part, portions 64A and 68A, and executing portions 64A and 68A concurrently in parallel, at least in part (e.g., using execution unit sets 72A and 72N, respectively), as a result of invoking function call 62, this may substantially improve the execution parallelism of the resultant list 60 in this embodiment (e.g., compared to executing lists 66 and 70 by calling separately, sequentially invoking function calls 80 and 82). Further advantageously, given the natures of RC4 and MD-5 algorithms, better overall use of execution and/or load-store units in PC 40A may be obtained by executing list 60, compared to that which may result such separate, sequential execution of lists 66 and 70. Comparable advantages may be obtainable, in this embodiment, for example, if Data Encryption Standard (DES)/Triple DES (3DES) is employed instead of, or in addition to, RC4. The DES/3DES algorithm that may be employed may be compatible with that described in, e.g., "Data Encryption Standard (DES)," Federal Information Standards Publication (FIPS Pub) 46-3, reaffirmed Oct. 25, 1999, National Institute of Standards and Technology (NIST). Many other variations, modifications, and alternatives are possible without departing from this embodiment.

In the second of these three possibilities, algorithm 75 may implement, at least in part, an AES algorithm, and algorithm 77 may implement, at least in part, a secure hash algorithm (SHA)-1 algorithm. This SHA-1 algorithm may be compatible with that described in, for example, "Secure Hash Standard," FIPS Pub 180-2, Aug. 1, 2002, NIST. Given the natures of AES and SHA-1 algorithms, the AES algorithm may be implementable, at least in part, using one or more Intel® SSE AES-NI instructions, and SHA-1 algorithm may be implementable, at least in part, using one or more general purpose integer instructions. As a result, at least in part, of this, different micro architectural resources (e.g., including different respective sets of execution units) in PC 40A may be utilized to execute portions 64A and 68A concurrently in parallel, at least in part. Advantageously, this may improve the execution parallelism of the resultant list 60 in this embodiment (e.g., compared to executing lists 66 and 70 by calling separately, sequentially invoking function calls 80 and 82).

In the third of these three possibilities, algorithm 75 may implement, at least in part, an AES in cipher block chaining mode (AES-CBC) algorithm, and algorithm 77 may implement, at least in part, an AES in cipher block chaining with extensions mode (AES-XCBC) algorithm. These algorithms may be implemented, at least in part, using, for example, one or more Intel® SSE AES-NI instructions. Alternatively or additionally, in this third possibility, algorithm 75 may implement, at least in part, an AES in counter mode algorithm, and algorithm 77 may implement, at least in part, a Galois-Hash, respectively. This arrangement may be implemented, at least in part, using, for example, one or more Intel® SSE AES-NI and PCLMULQDQ-NI instructions.

In this embodiment, the RC4 algorithm that may be employed, at least in part, may be designed to utilize runtime disambiguation of memory references in order to achieve higher throughput. Also, various improvements described in "Improving the Performance of the Secure Hash Algorithm (SHA-1)," published Mar. 30, 2010, by Intel Corporation. Furthermore, other and/or additional (e.g., micro architectural) properties of HP 12, one or more of PC 40A . . . 40N, portions 64A and/or 68A (e.g., other and/or in addition to those described and/or used herein) may also or alternatively be utilized in this embodiment to improve processing efficiency and/or time without departing from this embodiment.

In this embodiment, two or more (e.g., buffers 90A and 90B) of the buffers 91 that may be concurrently processed, at least in part, by the mutually different sets 72A, 72N of execution units may have different respective sizes. However, without departing from this embodiment, some or all of the buffers 91 may have respectively identical sizes. This concurrent processing, at least in part, of buffers 90A and 90B (1) may comprise, at least in part, currently executing by the respective execution unit sets 72A, 72N the respective sets 202, 203 of algorithmic operations, and/or (2) may result, at least in part, from execution, at least in part, of instruction list 60. However, without departing from this embodiment, such concurrent processing, at least in part, may be independent, at least in part, of and/or may not result from execution of instruction list 60.

Figure 3:
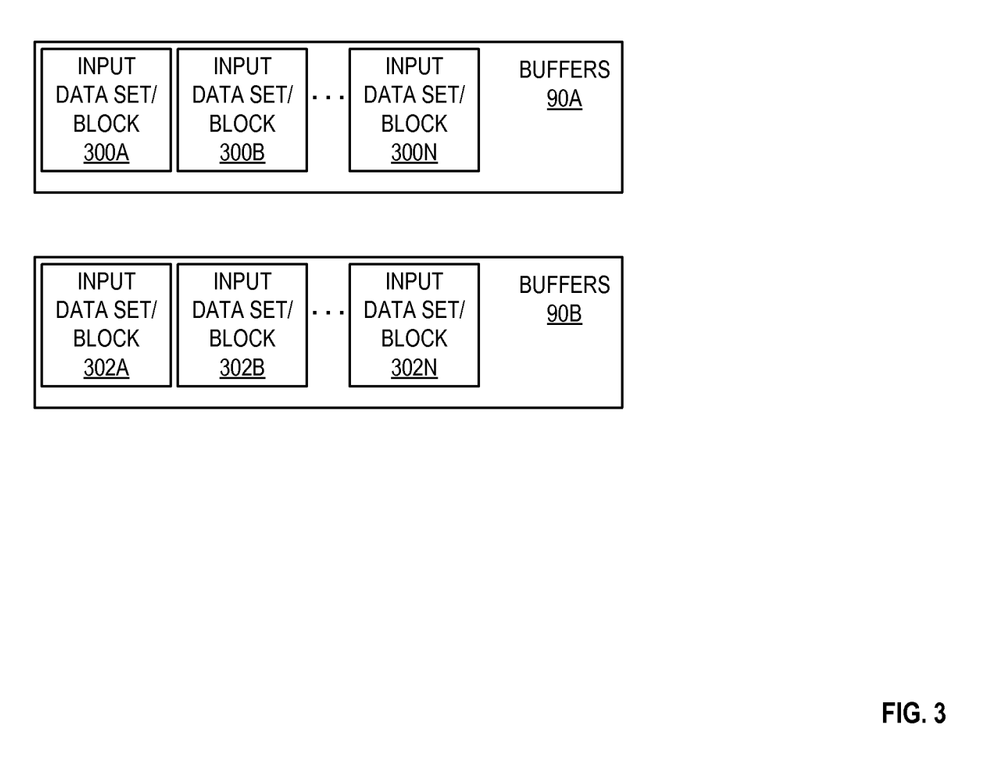
FIG. 3 illustrates features in an embodiment.

As shown in FIG. 3, one or more buffers 90A may comprise input data sets and/or blocks 300A . . . 300N, and one or more buffers 90B may comprise input data sets and/or blocks 302A . . . 302N, respectively. In an exemplary implementation, execution unit sets 72A, 72N may concurrently operate, at least in part, upon respective blocks 300A . . . 300N and/or respective blocks 302A . . . 302N to carry out, in parallel, at least in part, AES-CBC encryption upon one or more of the blocks 300A . . . 300N and one or more of the blocks 302A . . . 302N. Thus, in this exemplary implementation, operation sets 202, 203 may concurrently implement the same respective AES-CBC encryption algorithm upon buffers 90A, 90B in parallel.

In another exemplary implementation, execution unit sets 72A, 72N may concurrently operate, at least in part, upon respective blocks 300A . . . 300N and/or respective blocks 302A . . . 302N to carry out, in parallel, at least in part, 3DES algorithm upon one or more of the blocks 300A . . . 300N and one or more of the blocks 302A . . . 302N. This 3DES algorithm may be implemented, at least in part, using logical primitive instructions (e.g., exclusive-or, shift, table look up, etc. operations). Thus, in this exemplary implementation, operation sets 202, 203 may concurrently implement the same respective 3DES algorithm upon buffers 90A, 90B in parallel. In each of these two exemplary implementations, by concurrently executing, at least part, operation sets 202, 203 upon buffers 90A, 90B in the above manner, data dependencies may be reduced, improved and/or better use of execution unit resources may be achieved, and/or algorithm performance and/or throughput may be improved.

Various implementations may operate, at least in part, upon data blocks and/or buffers of identical size. However, at least certain implementations may operate, at least in part, upon data blocks and/or buffers of differing sizes. For example, memory 21 may comprise, at least in part, scheduler 206, one or more applications 210, and/or a plurality of jobs 212A . . . 212N (see FIG. 2). In this embodiment, scheduler 206 and/or applications 210 may be or comprise one or more program processes that may be executed, at least in part, by one or more cores (e.g., PC 40A). In this embodiment, a job may comprise a data object and/or structure that may describe, in whole or in part, (1) one or more items (e.g., one or more buffers), for example, by reference to one or more addresses and/or sizes of the one or more items, upon which the algorithm operations may be intended to operate, and/or (2) related information, such as, one or more initial and/or final hash values associated with the operations. In this embodiment, the jobs 212A . . . 212N may correspond, at least in part, to the buffers 90A, 90B.

Scheduler 206 may comprise and/or provide interfaces 208 and 211. Interface 208 may be or comprise a job-oriented interface that may receive, at least in part, the jobs 212A . . . 212N from one or more applications 210. Interface 211 may be or comprise a parallel interface that may present the jobs 212A . . . 212N for execution to and/or by algorithms 102, 104 in such a way that the operation sets 202, 203 may be concurrently carried out upon the buffers 90A, 90B. For example, scheduler 206 may be capable, at least in part, of scheduling and/or presenting, via interface 211, the jobs 212A . . . 212N received via interface 208, to the sets 72A, 72N of execution units in such a way that execution unit sets 72A, 72N may concurrently carry out, at least in part, the respective operation sets 202, 203 upon the buffers 90A, 90B, respectively.

In this embodiment, the scheduler 206 may accumulate jobs received via interface 208 until a predetermined number of jobs have been accumulated, and then the scheduler 206 may present, via the interface 211, the accumulated jobs for execution to and/or by the algorithms 102, 104. The jobs that may be submitted for processing may be processed such that respective amounts of data in the buffers may be concurrently processed. These respective amounts of data may be equal to the smallest sized buffer that is being concurrently processed in and/or is associated with the submitted jobs. Thus, for example, if buffer 90A is the smallest sized buffer that is being processed concurrently with one or more other buffers, then the respective amounts of data in each of these other buffers that may be processed concurrently with buffer 90A may be equal to the size of buffer 90A. Alternatively or additionally, succeeding respective blocks in each respective buffer may be concurrently processed, in successive processing iterations. As one or more jobs are completed, one or more new jobs may be accumulated, and this process may continue for multiple iterations.

Jobs 212A . . . 212N may be submitted to the interface 208 via one or more function calls (e.g., 62) by the one or more applications 210. The call 62 may either return (e.g., interface 208) to the one or more applications 210 a completed job or a null value. Depending upon the particular implementation and/or operation of one or more applications 210, scheduler 206 may return completed jobs 212A . . . 212N to the one or more applications 210 either (1) in an order (e.g., "in-order") that corresponds to the order in which the jobs were received, at least in part, by the interface 208, or (2) in an order (e.g., "out-of-order") that is different from and/or does not correspond, at least in part, to the order in which the jobs were received, at least in part, by the interface 208. That is, in the latter situation, the scheduler 206 may be permitted to return the completed jobs 212A . . . 212N to the one or more applications out-of-order.

If the scheduler 206 is permitted to return completed jobs 212A . . . 212N out-of-order, then after the scheduler 206 has accumulated a maximum permitted number of submitted jobs (e.g., corresponding to the number of jobs to be accumulated before presenting the accumulated jobs to one or more of the algorithms 102, 104), the scheduler 206 may provide to and permit to be concurrently processed the accumulated submitted jobs, in the manner described above. After a job is returned as a completed respective job, then, for each respective job that is submitted to the scheduler 206 via interface 208, the scheduler 206 may provide to one or more of the algorithms 102, 104 an additional respective job, and when it completes, may return the thus completed respective job to the one or more applications 210.

Conversely, if the scheduler 206 is to return completed jobs in-order, then if a first job (e.g., job 212A) is received, at least in part, by interface 208 prior to receipt, at least in part, by interface 208 of a second job (e.g., job 212B), and the second job 212B is completed prior to the completion of the first job 212A, then scheduler 206 may retain (and thereby delay the return of) the previously completed job 212B until after the after-completed job 212A has been completed and returned. If, however, after a predetermined time period, the first received job 212A has not yet been completed, and a maximum permitted number of submitted jobs have been accumulated by scheduler 206, then scheduler 206 may flush one or more jobs (e.g., including the second received job 212B). In this embodiment, the flushing of a job may involve the return of the job, as completed, or a null value if there are presently no accumulated jobs. This may involve, in this embodiment, executing an actual job's underlying algorithm while adding duplicate and/or dummy jobs to be processed in parallel with the actual job. Alternatively, different implementations of the underlying algorithm may be employed that may utilize fewer buffers or a single buffer. In this embodiment, in order to improve efficiency, this maximum permitted number of submitted jobs may be empirically chosen to be large enough so as to permit scheduler 206 not to accumulate this number of jobs during usual expected operation.

Additionally or alternatively, in order to avoid inefficiencies that may result from starvation situations, scheduler 206 may flush one or more submitted jobs if no new jobs have been queued for processing by scheduler 206 within a predetermined time period. This may implemented via, for example, one or more watchdog threads executed by one or more of the processor cores (e.g., PC 40A). Also additionally or alternatively, in the case of one or more applications and/or algorithms in which the maximum time between jobs is bounded so as not to exceed a reasonably chosen upper bound, such starvation may not occur, and therefore, these types of operations to ameliorate the effects of starvation may not be necessary in connection with such applications and/or algorithms.

In this embodiment, one or more AES algorithms may be implemented via scheduler 206 which may be implemented as an in-order scheduler (not shown) layered upstream (in terms of processing) of an out-of-order scheduler (not shown). In this implementation, the scheduler 206 may accumulate jobs in a fixed array that is serviced as a circular buffer.

At least one location in the array may be unused to permit it to be returned to the one or more applications 210 when a new job is submitted to the scheduler 206.

When a job is submitted to scheduler 206, it may be initially submitted to the downstream out-of-order scheduler. In this situation, if the out-of-order scheduler had previously been empty (e.g., no accumulated jobs), the thus submitted job may be indicated as being an earliest submitted job. Conversely, in this situation, if the out-of-order scheduler is neither empty nor full (e.g., has accumulated fewer jobs than the maximum permitted number of submitted jobs), then if the earliest submitted job has already completed but has not yet been returned, then this earliest submitted job may be returned, but otherwise, a null value may be returned. Further conversely, in this situation, if the out-of-order scheduler is full, and the earliest submitted job has not yet been completed, the out-of-order scheduler may be flushed until the earliest submitted job has completed and been returned. The above approach may reduce or eliminate the need for dynamic memory allocation. This may also limit the maximum number of jobs that may currently be in-flight and/or in-process, and therefore, also may limit worst-case processing latency.

In this embodiment, scheduler 206 may be coded using techniques and/or languages that may permit scheduler 206 to exhibit sufficiently reduced processing overhead so as not to overshadow, in terms of processing, the advantages that may be achieved in this embodiment, especially in the case of relatively small sized buffers. For example, in this embodiment, scheduler 206 may be written in one or more relatively low level languages (e.g., assembler) instead of one or more relatively higher level languages (e.g., C) in order to take advantages of efficiencies that may be obtainable via efficient low level language coding. Additionally, if special purpose instructions are available to perform with greater efficiency certain operations in this embodiment, they may be employed to advantage. For example, depending upon the sizes of the buffers and/or data blocks, an Intel® PHMINPOSUW SSE instruction may be employed to determine and/or compute in one operation the smallest sized buffer and/or data block for use by the scheduler 206. This may avoid conditional logic and/or potential branch mis-predicts.

An embodiment may include circuitry to execute, at least in part, a first list of instructions and/or to concurrently process, at least in part, first and second buffers. The execution of the first list of instructions may result, at least in part, from invocation of a first function call. The first list of instructions may include at least one portion of a second list of instructions interleaved, at least in part, with at least one other portion of a third list of instructions. The portions may be concurrently carried out, at least in part, by one or more (e.g., different respective) sets of execution units of the circuitry. The second and third lists of instructions may implement, at least in part, respective algorithms that are amenable to being invoked by separate respective function calls. The concurrent processing may involve, at least in part, complementary algorithms and/or may be, at least in part, by mutually different sets of execution units of the circuitry.

Many other and/or additional modifications are possible. For example, in addition to or as an alternative to the concurrent buffer processing described above, if the respective data blocks comprises buffers 90A, 90B are of the same size, they may be currently operated upon using SIMD instructions and/or operations. In this arrangement, XMM registers (not shown) comprised in PC 40A may be, for example, 128-bits wide. Therefore, each such XMM register may store, four 32-bit values (e.g., corresponding to the respective data blocks) that may be concurrently operated upon via one or more SIMD instructions. These (and/or other) instructions may implement, at least in part, encryption of each of the respective packets 52 independently of each other. Alternatively or additionally, these (and/or other) instructions may be involved, at least in part, in data de-duplication in which hash digests of input data partitioned into the respective data blocks may be computed. Alternatively or additionally, one or more Intel® AESENC instructions may be utilized to implement, at least in part, AES counter-mode or CBC decryption upon multiple data blocks in parallel. Many other variations are possible. For example, additional features that may be comprised and/or used in this embodiment may be found in, for example, Gopal et al., "Processing Multiple Buffers in Parallel to Increase Performance on Intel® Architecture Processors," Intel Corporation, July 2010, and/or Gopal et al., "Fast Cryptographic Computation on Intel® Architecture Processors Via Function Stitching," Intel Corporation, April 2010. Accordingly, this embodiment should be viewed broadly as encompassing all such alternatives, modifications, and alternatives.

What is claimed is:

1. An apparatus comprising:
   circuitry to perform the following subparagraphs (a) and (b):
   (a) execution, at least in part, of a first list of instructions, the execution resulting, at least in part, from invocation of a first function call, the first list of instructions comprising at least one portion of a second list of instructions interleaved, at least in part, with at least one other portion of a third list of instructions, the at least one portion and the at least one other portion to be concurrently carried out, at least in part, by one or more sets of execution units of the circuitry, the second list and the third list of instructions being to implement, at least in part, respective algorithms that are amenable to being invoked by separate respective function calls; and
   (b) concurrent processing, at least in part, of a first buffer and a second buffer, the concurrent processing involving, at least in part, complementary algorithms;
   wherein:
   at least one tool is to select the at least one portion and the at least one other portion so as to permit executing of the at least one portion and the at least one other portion in the first list of instructions by the one or more sets of execution units to exhibit a relatively higher degree of parallel execution in the one or more sets of execution units relative to a relatively lower degree of parallel execution that would occur if the at least one portion and the at least one other portion were to be executed as a result of separately invoking the separate respective function calls, the at least one tool permitting user selection of the at least one portion and the at least one other portion (1) at instruction-level interleaving granularity, and (2) such that the at least one portion and the at least one other portion are to be executed, at least in part, by different respective execution units in a single respective core; and
   the concurrent processing results, at least in part, from the execution, at least in part, of the first set of instructions.

2. The apparatus of claim 1, wherein:
   the circuitry is capable of performing both of the subparagraphs (a) and (b);

the respective algorithms comprise, at least in part, respective cryptographic algorithms;
the concurrent processing involves, at least in part, the respective cryptographic algorithms; and
the sets of execution units are comprised in a processor core.

3. The apparatus of claim 1, wherein:
the first buffer and the second buffer have different respective sizes;
the concurrent processing comprises, at least in part, concurrently executing respective sets of algorithmic operations;
the apparatus comprises a scheduler to provide a first interface and a second interface;
the first interface being to receive, at least in part, from at least one application a plurality of jobs, the plurality of jobs corresponding, at least in part, to the first buffer and the second buffer; and
the second interface being to present the plurality of jobs for execution by the respective sets of algorithmic operations in such a way as to permit the respective sets of algorithmic operations to be concurrently carried out upon the first buffer and the second buffer.

4. The apparatus of claim 3, wherein:
the scheduler is to return the plurality of jobs to the at least one application in a first order that corresponds to a second order in which the plurality of jobs were received, at least in part, by the first interface;
the plurality of jobs comprises a first job that is received, at least in part, by the first interface prior to receipt, at least in part, by the first interface of a second job;
if the second job is completed prior to the first job, the scheduler is to delay returning of the second job until after the first job has been completed.

5. The apparatus of claim 3, wherein:
the scheduler is permitted to return the plurality of jobs to the at least one application in a first order that differs from a second in which the plurality of jobs were received, at least in part, by the first interface; and
after the scheduler has accumulated a maximum permitted number of submitted jobs, respective amounts of data in the buffers are processed, the respective amounts being equal to the smallest sized buffer associated with the submitted jobs.

6. The apparatus of claim 1, wherein:
the respective algorithms operate, at least in part, upon respective input data sets that satisfy one or more of the following subparagraphs (c) to (e):
(c) the respective input data set of one of the respective algorithms is output, at least in part, by the other of the respective algorithms;
(d) the respective input data sets are identical, at least in part, to each other; and
(e) the respective input data sets are independent of each other.

7. The apparatus of claim 1, wherein:
a first type of instruction predominates in the at least one portion of the second list of instructions;
a second type of instruction predominates in the at least one other portion of the third list of instructions; and
one of the following subparagraphs (f) to (h) is satisfied:
(f) the first type of instruction and the second type of instruction both are a general purpose integer type of instruction;
(g) the first type of instruction is a general purpose integer type of instruction and the second type of instruction is a single instruction multiple data (SIMD) type of instruction; and
(h) the first type of instruction and the second type of instruction both are a SIMD type of instruction.

8. Computer-readable memory storing one or more instructions that when executed by a machine result in performance of operations comprising the following subparagraphs (a) and (b):
(a) execution, at least in part, of a first list of instructions, the execution resulting, at least in part, from invocation of a first function call, the first list of instructions comprising at least one portion of a second list of instructions interleaved, at least in part, with at least one other portion of a third list of instructions, the at least one portion and the at least one other portion to be concurrently carried out, at least in part, by one or more execution units, the second list and the third list of instructions being to implement, at least in part, respective algorithms that are amenable to being invoked by separate respective function calls; and
(b) concurrent processing, at least in part, of a first buffer and a second buffer, the concurrent processing involving, at least in part, complementary algorithms;
wherein:
at least one tool is to select the at least one portion and the at least one other portion so as to permit executing of the at least one portion and the at least one other portion in the first list of instructions by the one or more sets of execution units to exhibit a relatively higher degree of parallel execution in the one or more sets of execution units relative to a relatively lower degree of parallel execution that would occur if the at least one portion and the at least one other portion were to be executed as a result of separately invoking the separate respective function calls, the at least one tool permitting user selection of the at least one portion and the at least one other portion (1) at instruction-level interleaving granularity, and (2) such that the at least one portion and the at least one other portion are to be executed, at least in part, by different respective execution units in a single respective core; and
the concurrent processing results, at least in part, from the execution, at least in part, of the first set of instructions.

9. The memory of claim 8, wherein:
the operations comprise, at least in part, both of the subparagraphs (a) and (b);
the respective algorithms comprise, at least in part, respective cryptographic algorithms;
the concurrent processing involves, at least in part, the respective cryptographic algorithms; and
the sets of execution units are comprised in a processor core.

10. The memory of claim 8, wherein:
the first buffer and the second buffer have different respective sizes;
the concurrent processing comprises, at least in part, concurrently executing respective sets of algorithmic operations;
a scheduler is to provide a first interface and a second interface;
the first interface being to receive, at least in part, from at least one application a plurality of jobs, the plurality of jobs corresponding, at least in part, to the first buffer and the second buffer; and the second interface being to present the plurality of jobs for execution by the respective sets of algorithmic operations in such a way as to permit the respective sets of algorithmic operations to be concurrently carried out upon the first buffer and the second buffer.

11. The memory of claim 10, wherein:
the scheduler is to return the plurality of jobs to the at least one application in a first order that corresponds to a second order in which the plurality of jobs were received, at least in part, by the first interface;
the plurality of jobs comprises a first job that is received, at least in part, by the first interface prior to receipt, at least in part, by the first interface of a second job;
if the second job is completed prior to the first job, the scheduler is to delay returning of the second job until after the first job has been completed.

12. The memory of claim 10, wherein:
the scheduler is permitted to return the plurality of jobs to the at least one application in a first order that differs from a second in which the plurality of jobs were received, at least in part, by the first interface; and
after the scheduler has accumulated a maximum permitted number of submitted jobs, respective amounts of data in the buffers are processed, the respective amounts being equal to a smallest sized buffer associated with the submitted jobs.

13. The memory of claim 8, wherein:
the respective algorithms operate, at least in part, upon respective input data sets that satisfy one or more of the following subparagraphs (c) to (e):
  (c) the respective input data set of one of the respective algorithms is output, at least in part, by the other of the respective algorithms;
  (d) the respective input data sets are identical, at least in part, to each other; and
  (e) the respective input data sets are independent of each other.

14. The memory of claim 8, wherein:
a first type of instruction predominates in the at least one portion of the second list of instructions;
a second type of instruction predominates in the at least one other portion of the third list of instructions; and
one of the following subparagraphs (f) to (h) is satisfied:
  (f) the first type of instruction and the second type of instruction both are a general purpose integer type of instruction;
  (g) the first type of instruction is a general purpose integer type of instruction and the second type of instruction is a single instruction multiple data (SIMD) type of instruction; and
  (h) the first type of instruction and the second type of instruction both are a SIMD type of instruction.

15. A method comprising the following subparagraphs (a) and (b):
  (a) execution, at least in part, by circuitry, of a first list of instructions, the execution resulting, at least in part, from invocation of a first function call, the first list of instructions comprising at least one portion of a second list of instructions interleaved, at least in part, with at least one other portion of a third list of instructions, the at least one portion and the at least one other portion to be concurrently carried out, at least in part, by one or more sets of execution units, the second list and the third list of instructions being to implement, at least in part, respective algorithms that are amenable to being invoked by separate respective function calls; and
  (b) concurrent processing, at least in part, of a first buffer and a second buffer, the concurrent processing involving, at least in part, complementary algorithms;
wherein:
  at least one tool is to select the at least one portion and the at least one other portion so as to permit executing of the at least one portion and the at least one other portion in the first list of instructions by the one or more sets of execution units to exhibit a relatively higher degree of parallel execution in the one or more sets of execution units relative to a relatively lower degree of parallel execution that would occur if the at least one portion and the at least one other portion were to be executed as a result of separately invoking the separate respective function calls, the at least one tool permitting user selection of the at least one portion and the at least one other portion (1) at instruction-level interleaving granularity, and (2) such that the at least one portion and the at least one other portion are to be executed, at least in part, by different respective execution units in a single respective core; and
  the concurrent processing results, at least in part, from the execution, at least in part, of the first set of instructions.

16. The method of claim 15, wherein:
the method comprise, at least in part, both of the subparagraphs (a) and (b);
the respective algorithms comprise, at least in part, respective cryptographic algorithms;
the concurrent processing involves, at least in part, the respective cryptographic algorithms; and
the sets of execution units are comprised in a processor core.

17. The method of claim 15, wherein:
the first buffer and the second buffer have different respective sizes;
the concurrent processing comprises, at least in part, concurrently executing respective sets of algorithmic operations;
a scheduler is to provide a first interface and a second interface;
the first interface being to receive, at least in part, from at least one application a plurality of jobs, the plurality of jobs corresponding, at least in part, to the first buffer and the second buffer; and
the second interface being to present the plurality of jobs for execution by the respective sets of algorithmic operations in such a way as to permit the respective sets of algorithmic operations to be concurrently carried out upon the first buffer and the second buffer.

18. The method of claim 17, wherein:
the scheduler is to return the plurality of jobs to the at least one application in a first order that corresponds to a second order in which the plurality of jobs were received, at least in part, by the first interface;
the plurality of jobs comprises a first job that is received, at least in part, by the first interface prior to receipt, at least in part, by the first interface of a second job;
if the second job is completed prior to the first job, the scheduler is to delay returning of the second job until after the first job has been completed.

19. The method of claim 17, wherein:
the scheduler is permitted to return the plurality of jobs to the at least one application in a first order that differs from a second in which the plurality of jobs were received, at least in part, by the first interface; and after the scheduler has accumulated a maximum permitted number of submitted jobs, respective amounts of data in the buffers are processed, the respective amounts being equal to a smallest sized buffer associated with the submitted jobs.

20. The method of claim 15, wherein:

the respective algorithms operate, at least in part, upon respective input data sets that satisfy one or more of the following subparagraphs (c) to (e):
- (c) the respective input data set of one of the respective algorithms is output, at least in part, by the other of the respective algorithms;
- (d) the respective input data sets are identical, at least in part, to each other; and
- (e) the respective input data sets are independent of each other.

21. The method of claim 15, wherein:

a first type of instruction predominates in the at least one portion of the second list of instructions;

a second type of instruction predominates in the at least one other portion of the third list of instructions; and one of the following subparagraphs (f) to (h) is satisfied:
- (f) the first type of instruction and the second type of instruction both are a general purpose integer type of instruction;
- (g) the first type of instruction is a general purpose integer type of instruction and the second type of instruction is a single instruction multiple data (SIMD) type of instruction; and
- (h) the first type of instruction and the second type of instruction both are a SIMD type of instruction.

\* \* \* \* \*

UNITED STATES PATENT AND TRADEMARK OFFICE
CERTIFICATE OF CORRECTION

| | |
|---|---|
| PATENT NO. | : 8,930,681 B2 |
| APPLICATION NO. | : 12/963298 |
| DATED | : January 6, 2015 |
| INVENTOR(S) | : James D. Guilford |

It is certified that error appears in the above-identified patent and that said Letters Patent is hereby corrected as shown below:

In the Specification

In column 1, line 15, delete "Cubcategory:" and insert -- Subcategory: --, therefor.

Signed and Sealed this
Thirtieth Day of June, 2015

Michelle K. Lee
*Director of the United States Patent and Trademark Office*